United States Patent [19]

Yoshigai

[11] Patent Number: 4,838,386

[45] Date of Patent: Jun. 13, 1989

[54] SIDE-PULL CALIPER BRAKE DEVICE

[75] Inventor: Kenichi Yoshigai, Osaka, Japan

[73] Assignee: Yoshigai Kikai Kinzoku Co., Ltd., Osaka, Japan

[21] Appl. No.: 197,163

[22] Filed: May 23, 1988

[30] Foreign Application Priority Data

May 29, 1987 [JP] Japan .............................. 62-85359[U]

[51] Int. Cl.⁴ ................................................ B62L 1/12
[52] U.S. Cl. ............................. 188/24.12; 188/24.19; 188/24.22; 188/72.3; 188/72.9
[58] Field of Search ............... 188/24.12, 24.21, 24.22, 188/24.19, 72.3, 72.9, 196 M

[56] References Cited

U.S. PATENT DOCUMENTS

| | | | |
|---|---|---|---|
| 4,482,033 | 11/1984 | Yoshigai | 188/24.19 |
| 4,597,474 | 7/1986 | Nagano | 188/24.21 |
| 4,635,759 | 1/1987 | Nagano | 188/24.22 |
| 4,754,853 | 7/1988 | Nagano | 188/24.19 |
| 4,768,623 | 9/1988 | Nagano | 188/24.21 X |

FOREIGN PATENT DOCUMENTS

| | | | |
|---|---|---|---|
| 3722712 | 1/1988 | Fed. Rep. of Germany | 188/24.21 |
| 1143998 | 10/1957 | France | 188/24.22 |
| 287447 | 4/1953 | Switzerland | 188/24.12 |

Primary Examiner—George E. A. Halvosa
Attorney, Agent, or Firm—Sixbey, Friedman, Leedom & Ferguson

[57] ABSTRACT

A side-pull caliper brake device comprising an arch support pivot, a first arch and a second arch rotatably supported by the pivot, first and second return springs each in the form of a coil and fitted around the pivot for biasing the first and second arches away from each other, and a Bowden cable for moving the arches toward or away from each other. The first spring has one end engaged with the pivot and the other end engaged with the first arch. The second spring has one end engaged with the second arch and the other end engaged with an adjusting ring rotatably mounted on the pivot. The adjusting ring is prevented from rotating relative to the pivot by a fastening nut. The force of the return springs is adjustable by rotating the adjusting ring. The springs are engaged in place without sliding and therefore smoothly bias the first and second arches. The springs, which are provided around the pivot and enclosed in the cavities, are free of deposition of mud or the like and protected from corrosion.

9 Claims, 2 Drawing Sheets

SIDE-PULL CALIPER BRAKE DEVICE

FIELD OF THE INVENTION AND RELATED ART STATEMENT

The present invention relates to a side-pull caliper brake device.

FIG. 3 shows a conventional side-pull caliper brake generally known. The brake comprises a large C-arch 1 and a small Y-arch 2 which are supported, each at an intermediate boss portion 3, by a pivot 4 movably about its axis. A brake shoe 5 is attached to the lower end of each arch. The outer wire and inner wire of a Bowden cable (not shown) are connected to the upper ends of the pair of arches, respectively. The opposed brake shoes 5 are moved toward each other into contact with the rim of a wheel (not shown) by pulling the inner wire to brake the wheel. Means for biasing the large and small arches 1, 2 away from each other, i.e. a return spring 6 resembling spectacles, is provided on the rear side of the two arches. The return spring 6 is held at its midportion by a spring holder 7 and has opposite ends bearing from inside on cutout portions 8A of pins 8 on the respective arches 1, 2 in engagement therewith.

When the conventional brake is operated, the two arches 1, 2 are pivotally moved inward against the return spring 6. The opposite ends of the spring 6 are moved toward each other while being slidingly moved in the direction of arrow shown in FIG. 4 in frictional contact with the pins 8 to encounter great resistance. Although grease is applied to the sliding portions to mitigate the frictional resistance, these portions become worn inevitably during a long period of use, rendering the brake difficult to operate smoothly to give off a frictional noise and permitting the brake to act on only one side of the wheel.

To diminish the frictional resistance at the sliding portion of the return spring 6, it has been proposed to mount a spring retaining roller 8B on the pin 8 and to cover the spring end with a synthetic resin layer 9 for bearing contact with the roller 8B.

The proposed roller 8B, although rotatable, frequently fails to rotate smoothly when mud or the like is deposited thereon, while a clearance occurs between the pin 8 and the roller during a long period of use, with the result that the proposed means becomes unable to fully reduce the frictional resistance due to the sliding contact between the return spring 6 and the roller 8B when the brake is operated.

Moreover, the return spring 6, the major portion of which is left exposed, is susceptible to corrosion and fails to fully function as contemplated when mud or the like is deposited thereon to cause an uneven brake action. The pins 8, which are left projected, are likely to cause an injury to the human body.

Furthermore, the force of the return spring 6 is not adjustable.

U.S. Pat. No. 4,482,033 discloses a brake which is prevented from acting on only one side.

However, the return spring of the disclosed device is of the same specticle type as shown in FIGS. 3 to 5, and is therefore not adjustable in its spring force, involves great frictional resistance, is prone to corrosion and is still likely to permit one-side brake action.

SUMMARY OF THE INVENTION

An object of the present invention which has been accomplished in view of the foregoing problems is to provide a brake device wherein uniform and equal clearances can be maintained between the rim and the opposed brake shoes at both sides of the rim at all times and which comprises return springs with an adjustable force, the brake device thus being made operable smoothly and properly over a prolonged period of time and having a good appearance.

Another object of the invention is to provide a brake device having return springs which are completely shut off from outside and made free of corrosion.

According to the present invention, a first arch and a second arch which are rotatably supported by a pivot are biased away from each other by a first spring and a second spring which are provided around the pivot concentrically therewith. Since the first and second arches are coupled by operating means, the force of the first and second springs act equivalently on the two arches.

The magnitude of the force of the return springs is adjustable by rotating an adjusting ring.

The operating means, when operated, moves the first and second arches about the pivot to bring opposite brake shoes into pressing contact with the rim to brake the wheel. At this time, the first and second arches act to wind or tension the first and second return springs, respectively, whereas since the opposite ends of the return springs are held engaged in place without sliding, no frictional resistance occurs, rendering the brake operable smoothly without giving off any frictional noise.

According to the present invention, each of the first and second arches has a boss portion formed with a cavity for accommodating the return spring therein. The spring has one end engaged with the arch boss portion and the other end fixedly with the pivot or the adjusting ring. The return springs therefore are not left exposed unlike the conventional one, are free of deposition of mud or the like and corrosion and fully function as contemplated, consequently permitting the opposed brake shoes to operate in good balance.

When grease is filled in the spring cavity, the spring can be protected from corrosion more effectively.

Since one of the return springs is fixed to the pivot through the adjusting ring, the force of the two springs is adjustable to tension the first and second arches equivalently by rotating the adjusting ring and thereby adjusting only one of the return springs, whereby the two arches can be maintained in balance. The arrangement described gives the brake device a neat appearance and increased commercial value.

Since the opposite ends of the return springs are held out of sliding movement, no frictional resistance acts, rendering the device operable smoothly over a prolonged period of time. Provision of a thrust bearing and washer between the rotatable parts obviates occurrence of disagreeable frictional noises and eliminates varying friction resistances that could lead to a one-side brake action.

DESCRIPTION OF THE PREFERRED EMBODIMENTS

An embodiment of the invention will be described below with reference to the drawings concerned.

Figure 2:
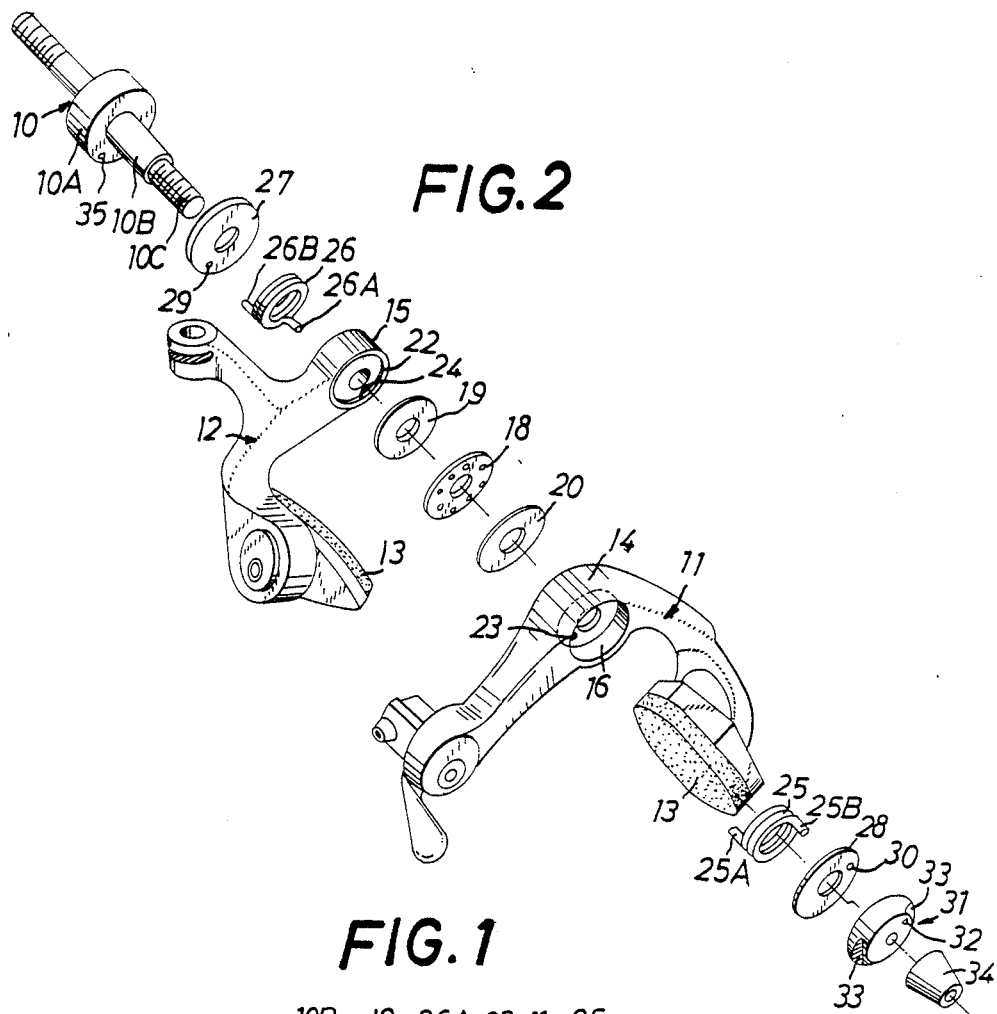
FIG. 2 is an exploded perspective view of the device as it is seen from the front.
Figure 1:
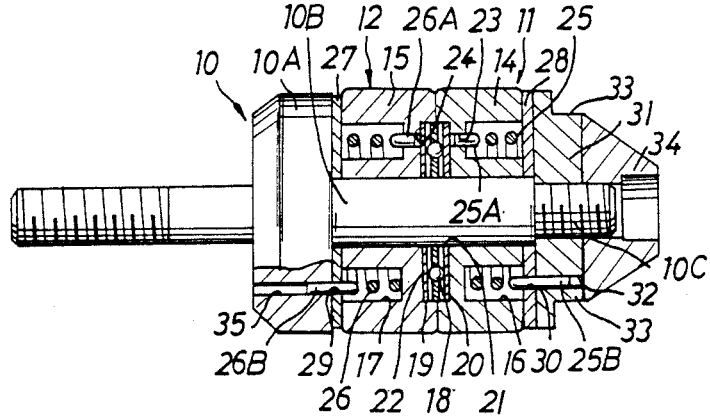
FIG. 1 is a fragmentary view in section showing a brake device of the invention.
Figure 3:
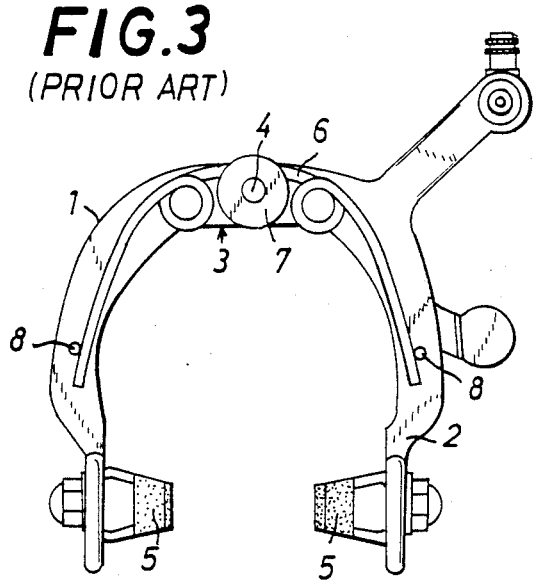
FIG. 3 is an overall rear view showing a conventional device.
Figure 5:
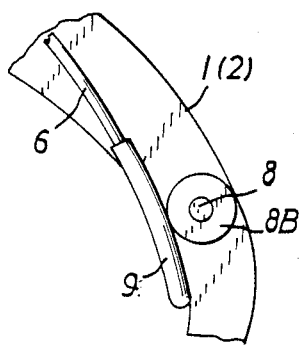
FIG. 5 is a similar view showing another conventional device.
Figure 4:
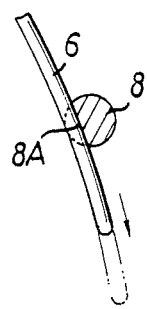
FIG. 4 is a fragmentary enlarged view of the same.

With reference to FIGS. 1 and 2, an arch support pivot 10 has a flange 10A approximately at its midportion, a rear portion which is to be fixed to the body of a bicycle, an arch support portion 10B on the front side of the flange 10A, and a screw portion 10C extending forward from the portion 10B.

A large C-arch 11 and a small Y-arch 12 each have a brake shoe 13 at its lower end. The large arch 11 has an intermediate boss portion 14, and the small arch 12 has an intermediate boss portion 15. These boss portions 14, 15 are fitted to each other in alignment axially thereof and rotatably supported by the support portion 10B of the pivot 10. Annular cavities 16, 17 in a back-to-back arrangement are formed in the boss portions 14, 15, respectively, around the pivot 10. Recesses 21, 22 for a bearing 18 to fit in along with washers 19, 20 are formed in the opposed faces of the boss portions 14, 15, which are further formed with holes 23, 24 in communication with the cavities 16, 17, respectively. Accordingly, the large and small arches 11, 12 are free to rotate relative to each other with the bearing 18 interposed therebetween and are precluded from interfering with each other by friction.

Return springs 25, 26 are accommodated in the cavities 16, 17, respectively. Each of the springs 25, 26 has one end 25A (26A) engaged in the hole 23 (24).

Washers 27, 28 have holes 29, 30 for the other ends 26B, 25B of the return springs 26, 25 to extend therethrough, respectively. Grease is filled in the cavities 16, 17.

An adjusting ring 31 is rotatably screwed on the screw portion 10C of the pivot 10 and has a hole 32 for the other end 25B of the return spring 25 to engage in. The spring end 25B can be fixed to the pivot 10 by the adjusting ring 31. The ring 31 has cutout portions 33 in its outer periphery for a turning tool to engage with.

A nut 34 is screwed on the screw portion 10C of the pivot 10 for fastening the arches.

The other end 26B of the return spring 26 is engaged in a hole 35 extending through the pivot flange 10A axially thereof.

With the above embodiment, the two return springs 25, 26 have their ends 25A, 26A engaged with the large and small arches 11, 12, respectively, and the other ends 25B, 26B fixed to the pivot 10. When the brake is operated, an unillustrated Bowden cable moves the upper ends of the large and small arches 11, 12 toward each other, thereby rotating the arches 11, 12 around the pivot 10 to bring the opposed brake shoes 13 into pressing contact with opposite sides of the rim (not shown) and brake the rim. Since the other ends 25B, 26B of the springs 25, 26 are fixed to the pivot 10 directly or indirectly, the ends 25A, 26A are moved in the spring winding or tensioning direction by the arches 11, 12 respectively at this time. When the brake is relieved of the operation force, the large and small arches 11, 12 are rotated in the reverse direction and have their lower ends moved away from each other by the action of the springs 25, 26, respectively, to return the brake shoes 13 to the initial position.

The tension of the return springs 25, 26 is adjustable by loosening the nut 34, rotating the adjusting ring 31 with a turning tool and tightening up the nut 34 with the ring 31 held in the rotated position to fix the ring 31 to the pivot 10. The rotation of the adjusting ring 31 winds or unwinds the return spring 25 on the large arch 11, and the torque of the spring 25 is delivered from the large arch 11 to the small arch 12 via the Bowden cable to make the tension of the spring 26 on the small arch 12 equal to the tension of the spring 25, whereby the two arches 11, 12 are held in balance.

The cavities 16, 17 in the boss portions 14, 15 of the above embodiment, although annular, are not limited to such form.

With the above embodiment, the bearing 18 interposed between the two arches 11, 12 greatly diminishes the frictional resistance between the arches, rendering the arches rotatable free of interference with each other and precluding one-side brake action. However, the bearing is replaceable by a bush.

Although the nut 34 is used as an example of arch fastening means, the nut 34 may be replaced by a setscrew provided on the adjusting ring 31 to prevent the rotation of the adjusting ring 31 relative to the pivot 10.

What we claim is:

1. A side-pull caliper brake device comprising an arch support pivot fixed to the frame of a bicycle or an equivalent thereto, a first arch and a second arch rotatably supported by the pivot, a pair of brake shoes fixed to the respective lower ends of the first and second arches and opposed to opposite sides of the rim of a wheel of the bicycle or the equivalent, means for biasing the first and second arches to move the brake shoes away from the rim sides, and operating means interconnecting the first and second arches of maintaining the brake shoes at a specified distance from each other against the biasing means and for moving the first and second arches toward each other to press the brake shoes against the respective rim sides, the device being characterized in that the biasing means comprises a first return spring and a second return spring each in the form of a coil and fitted around the pivot concentrically therewith, the first return spring having one end engaged with the pivot and the other end engaged with the first arch, the second return spring having one end engaged with the second arch and the other end engaged with an adjusting ring rotatably mounted on the pivot, fixing means being provided for preventing the adjusting ring and the pivot from rotating relative to each other whereby, upon adjusting of the tension of said first return spring via said adjusting ring, torque is transmitted via said operating means to said second return spring for holding said arches in balance.

2. A brake device as defined in claim 1 wherein the pivot has a flange projecting radially outward from a lengthwise intermediate portion thereof, a screw portion provided at the forward end portion of the pivot and an arch support portion provided between the flange and the screw portion, the first arch having a boss portion rotatably fitted around the arch support portion and positioned adjacent to the flange, the second arch having a boss portion rotatably fitted around the support portion and positioned toward the screw portion, the screw portion having the adjusting ring screwed thereon and a nut screwed on its forward end and serving as the fixing means, the boss portion of the first arch being formed in the end face thereof adjacent the flange with first cavity concentric with the pivot, the boss portion of the second arch being formed in the end face thereof adjacent the adjusting ring with a second cavity concentric with the pivot, the first return spring being accommodated in the first cavity, the second return spring being accommodated in the second cavity, the first and second return springs being held out of sight.

3. A brake device as defined in claim 2 wherein a hole for engaging the end of the return spring therein is formed in the end face of the flange closer to the first arch, the bottom wall of the first cavity, the bottom wall of the second cavity and the end face of the adjusting ring closer to the second arch.

4. A brake device as defined in claim 2 wherein a thrust bearing is interposed between the boss portion of the first arch and the boss portion of the second arch.

5. A brake device as defined in claim 2 wherein the adjusting ring has an outer peripheral portion engageable with a tool.

6. A brake device as defined in claim 2 wherein the first and second cavities are annular.

7. A brake device as defined in claim 2 wherein a washer is provided between the flange and the boss portion of the first arch, and another washer is provided between the second arch and the adjusting ring.

8. A brake device as defined in claim 2 wherein grease is filled in the first and second cavities.

9. A brake device as defined in claim 1 wherein the operating means is a Bowden wire.

* * * * *